United States Patent
Dunn et al.

(10) Patent No.: US 6,828,935 B1
(45) Date of Patent: Dec. 7, 2004

(54) DIGITALLY SYNTHESIZED PHASED ANTENNA FOR MULTIBEAM GLOBAL POSITIONING

(75) Inventors: Charles E. Dunn, Pasadena, CA (US); Lawrence E. Young, La Canada, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 322 days.

(21) Appl. No.: 10/176,761

(22) Filed: Jul. 19, 2002

(51) Int. Cl.[7] .............................. H01Q 3/22; G01S 5/14
(52) U.S. Cl. ................... 342/375; 342/357.12; 342/383
(58) Field of Search ................................ 342/380, 383, 342/375, 372, 357.12; 375/150

(56) References Cited

U.S. PATENT DOCUMENTS

| | | | |
|---|---|---|---|
| 3,319,249 A | 5/1967 | Blachier et al. | 343/100 |
| 3,600,701 A | 8/1971 | Gouldthorpe | 331/45 |
| 3,766,559 A | 10/1973 | Butcher, Jr. et al. | 343/100 |
| 4,719,469 A | 1/1988 | Beier et al. | 342/434 |
| 4,807,256 A | 2/1989 | Holmes et al. | 375/97 |
| 5,084,708 A | 1/1992 | Champeau et al. | 342/377 |
| 5,185,610 A | 2/1993 | Ward et al. | 342/357 |
| 5,274,386 A * | 12/1993 | Pellon | 342/380 |
| 5,341,301 A | 8/1994 | Shirai et al. | 364/449 |
| 5,510,799 A | 4/1996 | Wisehart | 342/373 |
| 5,534,882 A | 7/1996 | Lopez | 343/891 |
| 5,926,502 A * | 7/1999 | Schilling | 375/203 |
| 6,392,596 B1 * | 5/2002 | Lin et al. | 342/378 |

OTHER PUBLICATIONS

Thomas, J.B. *Functional Description of Signal in the Rogue GPS Receiver,* JPL Publication 88–15 (Jun. 1, 1988), pp. 1–1 through 7–4.

Thomas, J.B. *Signal–Processing Theory for the TurboRogue Receiver,* JPL Publication 95–6 (Apr. 1, 1995), pp. 1–1 through E–8.

\* cited by examiner

*Primary Examiner*—Gregory C. Issing
(74) *Attorney, Agent, or Firm*—John H. Kusmiss (57) ABSTRACT

In a system according to the proposed technique (see figure), the signal received by each element of the array antenna would be subjected to downconversion, and spread-spectrum demodulation and correlation as necessary; this processing would be performed separately from, and simultaneously with, similar processing of signals received by the other antenna elements. For the GPS implementation, following downconversion to baseband, the signals would be digitized, and all subsequent processing would be digital. In the digital process, residual carriers would be removed and each signal would be correlated with a locally generated model pseudo random-noise code, all following normal GPS procedure. As part of this procedure, accumulated values would be added in software and the resulting signals would be phase-shifted in software by the amounts necessary to synthesize the desired antenna directional gain pattern of peaks and nulls. The principal advantage of this technique over the conventional radio-frequency-combining technique is that the parallel digital baseband processing of the signals from the various antenna elements would be a relatively inexpensive and flexible means for exploiting the inherent multiple-peak/multiple-null aiming capability of a phased-array antenna. In the original intended GPS application, the peaks and nulls could be directed independently for each GPS signal being tracked by the GPS receiver. This will improve the SNR simultaneously for each GPS signal being tracked while steering multiple nulls toward sources of interference. The technique could also be applied to other code-division multiple-access communication systems.

22 Claims, 7 Drawing Sheets

DIGITALLY SYNTHESIZED PHASED ANTENNA FOR MULTIBEAM GLOBAL POSITIONING

ORIGIN OF THE INVENTION

The invention described hereunder was made in the performance of work under a NASA contract, and is subject to the provisions of Public Law 96-517 (35 U.S.C. 202) in which the Contractor has elected not to retain title.

BACKGROUND OF THE INVENTION

This technique uses precision digital techniques within a radio receiver to control the phasing of a phased-array antenna to aim the peaks of the antenna radiation pattern toward desired signal sources while aiming the nulls of the pattern toward interfering signal sources. The technique was conceived for use in a Global Positioning System (GPS) receiver, for which the desired signal sources would be GPS satellites and typical interference sources would be terrestrial objects that cause jamming or multipath propagation. Although conceived for GPS, the technique could also be used to optimize reception in spread-spectrum cellular-telephone and military communication systems.

SUMMARY OF THE DISCLOSURE

During reception of radio signals in a conventional phased-array antenna system, received signals at their original carrier frequencies are phase-shifted, then combined by analog circuitry. The combination signal is then subjected to downconversion and demodulation.

In a system according to the proposed technique (see figure), the signal received by each element of the array antenna would be subjected to downconversion, and spread-spectrum demodulation and correlation as necessary; this processing would be performed separately from, and simultaneously with, similar processing of signals received by the other antenna elements. For the GPS implementation, following downconversion to baseband, the signals would be digitized, and all subsequent processing would be digital. In the digital process, residual carriers would be removed and each signal would be correlated with a locally generated model pseudorandum-noise code, all following normal GPS procedure. As part of this procedure, accumulated values would be added in software and the resulting signals would be phase-shifted in software by the amounts necessary to synthesize the desired antenna directional gain pattern of peaks and nulls. The principal advantage of this technique over the conventional radio-frequency-combining technique is that the parallel digital baseband processing of the signals from the various antenna elements would be a relatively inexpensive and flexible means for exploiting the inherent multiple-peak/multiple-null aiming capability of a phased-array antenna. In the original intended GPS application, the peaks and nulls could be directed independently for each GPS signal being tracked by the GPS receiver. This will improve the SNR simultaneously for each GPS signal being tracked while steering multiple nulls toward sources of interference. The technique could also be applied to other code-division multiple-access communication systems.

Since the array phasing is accomplished under the control of the powerful processor operating the receiver, it can generate the appropriate phase shifts to steer an array even when the elements are not arranged in a regular pattern. They need not be co-planar. A byproduct of this technique is determination of the attitude angle of the array with respect to the incoming signals, which is a valuable data product for user platforms such as aircraft and satellites.

DETAILED DESCRIPTION

The present invention provides a way of both improving the signal-to-noise ratio and of reducing interference from jamming and multipath distortion in a GPS receiver by employing a phased array of antennas producing digitally-sampled signals whose outputs are phase shifted and added together. The array of antennas may be along a straight line or a square or may be a more general shape, and the antenna-to-antenna spacing D is, typically, a half wavelength or more, but is not contained to have regular spacing or to be coplanar. The phase delay imposed between a pair of elements to align the antenna's beam direction toward a satellite at an angle $\Phi$ relative to the array is:

$D \cos \Phi$.

Where $\Phi$ is the angle between the vector separating the elements and the vector from the antenna to the signal source.

Adding the outputs of the separate antenna elements together improves the signal-to-noise ratio because the noise adds incoherently while the signal adds coherently. Adding the outputs of the separate RF detectors together reduces the multipath distortion because the phase differences between the multipath components at the separate antennas can be made to cancel one another when added together.

The main problem in trying to implement such a phased array GPS receiver using conventional means is that each of the many antennas in the phased array requires an adjustable or tunable phase delay element, so that the entire array would require many such elements capable of operating at the GPS frequencies of 1.6 and 1.2 GHz. Such elements are prohibitively expensive and are incapable of fine adjustments in phase delay, and moreover would tend to introduce unknown phase shift errors. Moreover, such elements could not rapidly switch between different phase delays for rapid acquisition of successive ones of a group of GPS satellites. In order to compensate for such a shortcoming, the signals from the various antennas would need to be routed to respective sets of phase delay elements (one set for each satellite) and the various RF detectors would be ganged from one set of phase delay elements to the next in order to acquire the signals from the various GPS satellites in rapid succession. Of course, such an approach would only increase the number of the expensive 1.6 and 1.2 GHz phase delay elements, and therefore is not practical.

The invention avoids all such problems in a phased array antenna for a GPS receiver by first either down-converting or sub-sampling the incoming signals from each of the phased array antennas, converting the resulting sub-sampled or downconverted signals to digital signals, and then processing the digital signals using a digital synthesis of the phase delay elements.

In one aspect of the invention, a phase locked loop tracking the residual carrier phase of the chosen satellite is used as corrective feedback to fine tune the phase delay between adjacent antenna elements. In such a feedback control loop, the arrayed signal is maximized by slewing the phase shifts in order to finely adjust the antenna beam direction to the chosen satellite.

The digital synthesis of the phased array can be many orders of magnitude more precise than an analog version involving analog phase delay elements, according to the number of bits used to represent the phase model. The digital synthesis can be carried out in various equivalent ways. One way is to digitally multiply the sampled signal from each element by a phase factor ($e^{i\Theta}$) within the processor, where $\delta\Theta$ is the phase delay to be imposed on the corresponding antenna. Another way is to shift the index of a number controlled oscillator, by an amount corresponding to $\Theta$, which removes the residual carrier and converts the digital signal to in-phase and quadrature components.

Figure 1A:
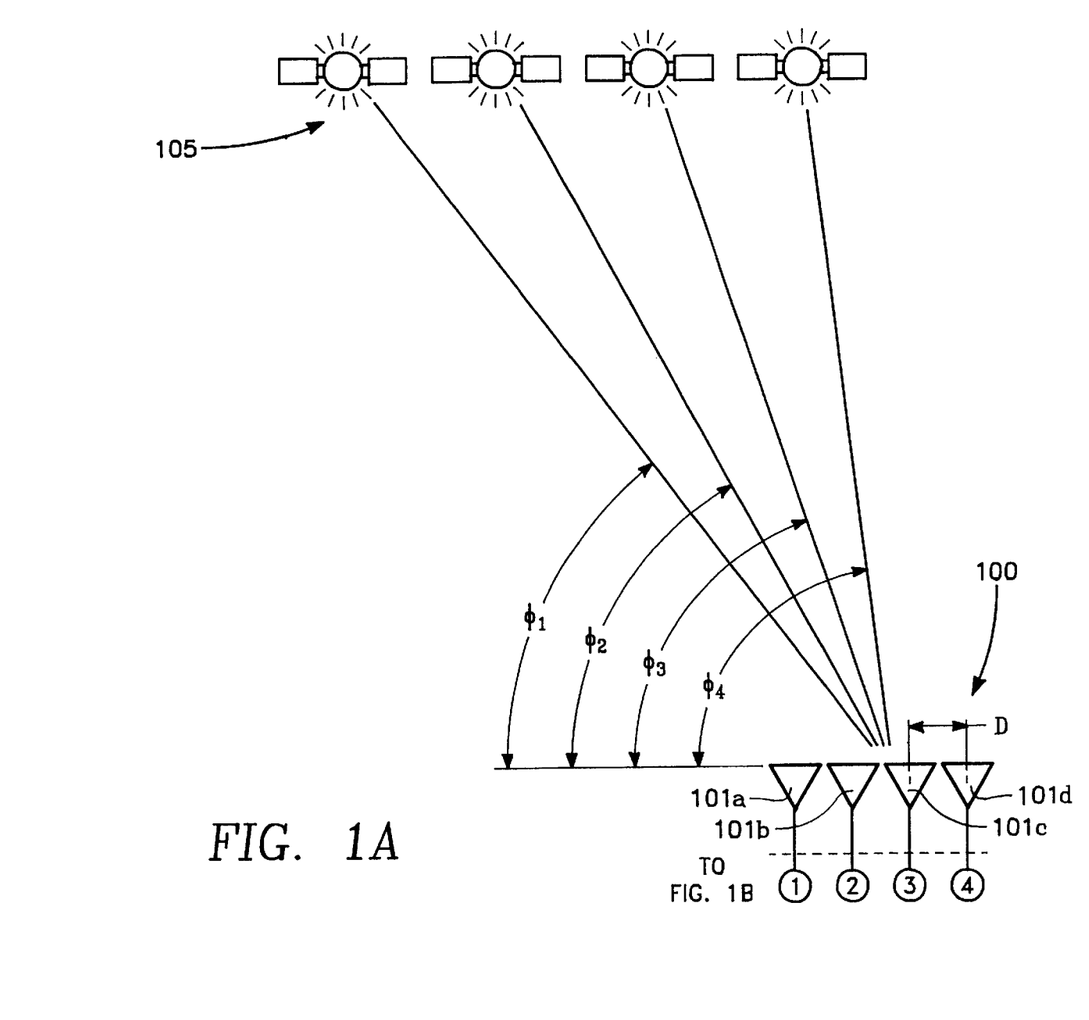
FIG. 1A-1C is a schematic diagram of a first embodiment of a phased array GPS receiver.
Figure 1B:
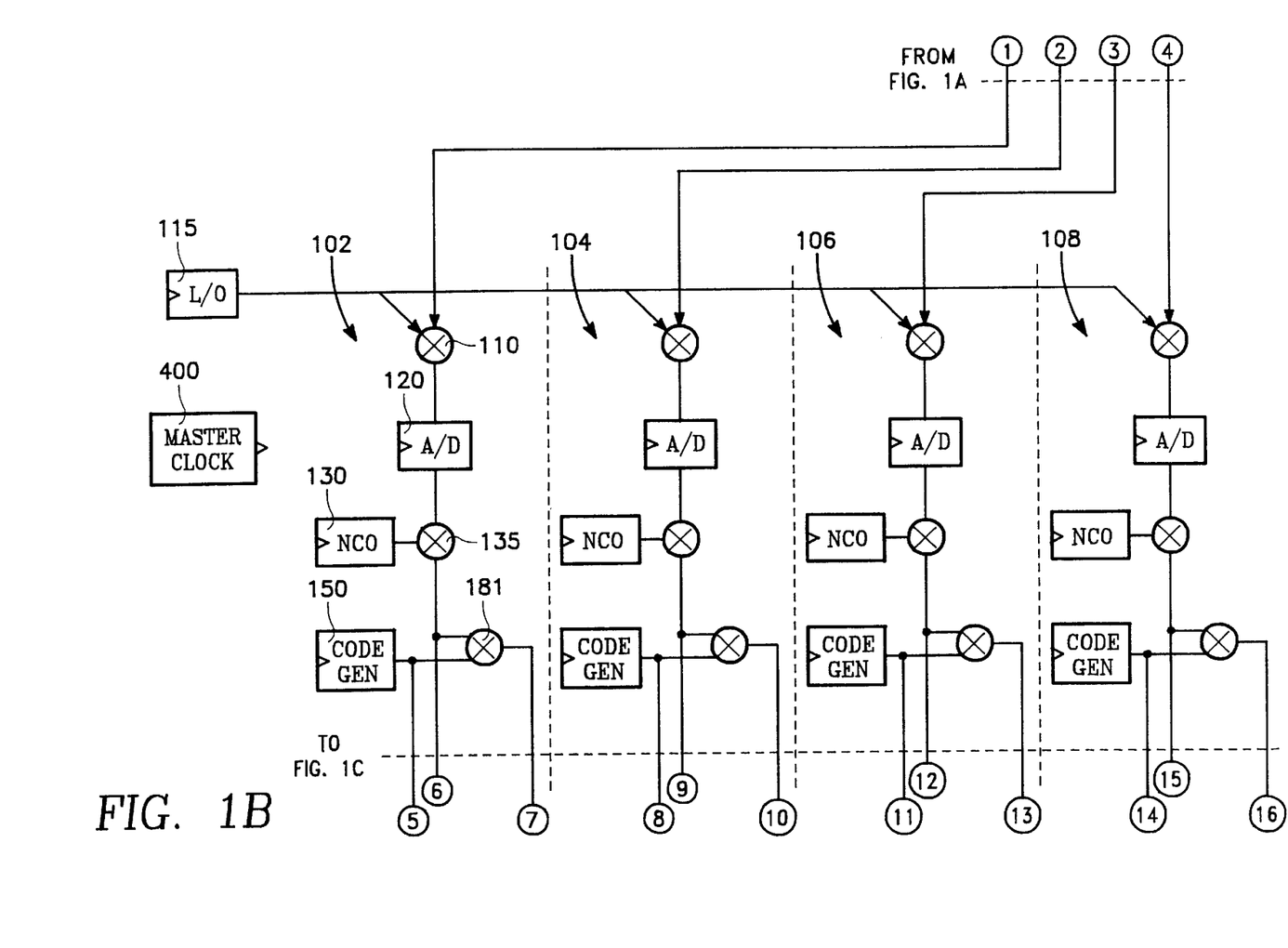
Figure 1C:
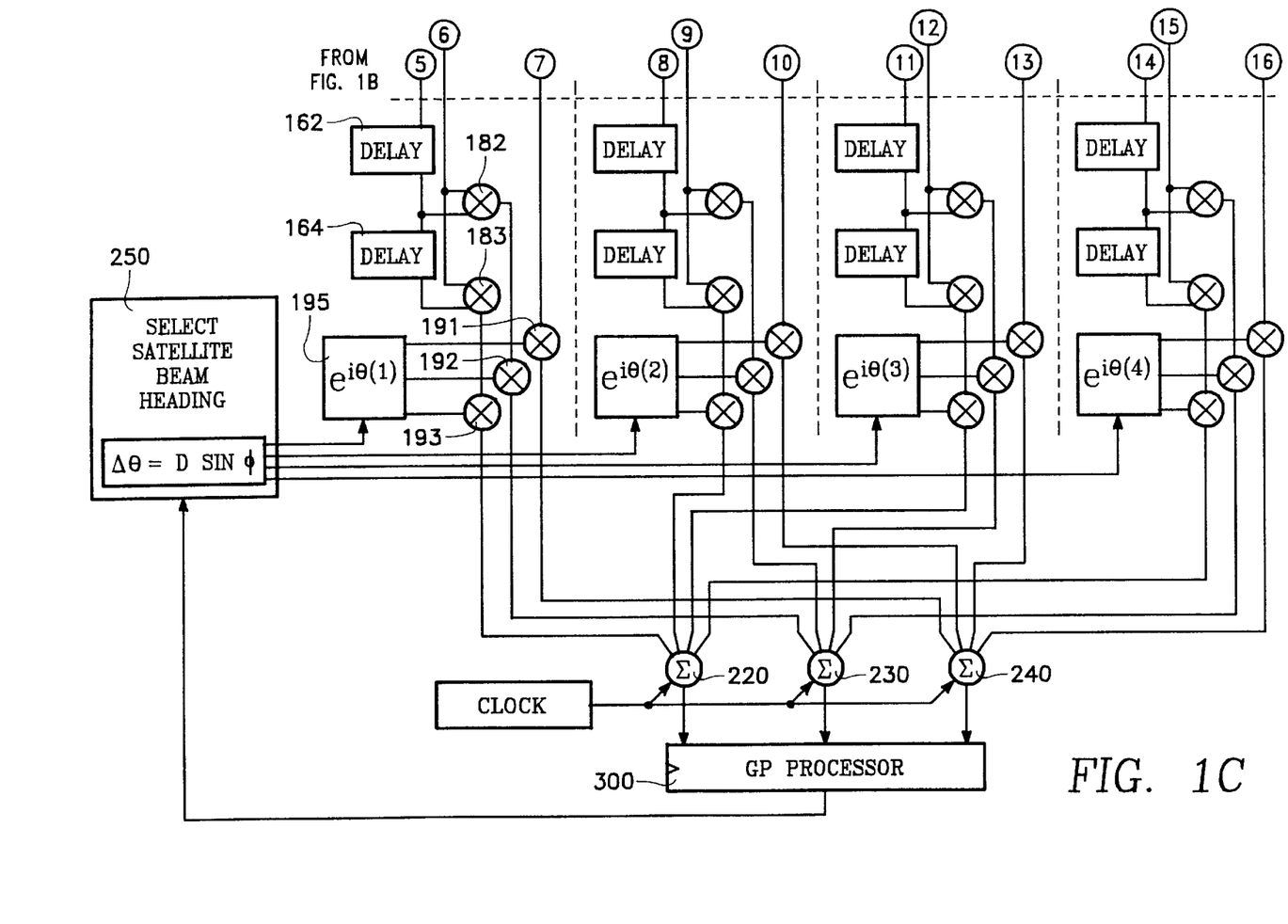

Referring now to FIG. 1A-1C, a global positioning receiver has a phased array 100 of individual antennas 101a, 101b, 101c, 101d, etc., lying (for example) along a straight line and spaced apart uniformly by a distance D between adjacent antennas. The beam direction of the array 100 is steered to a selected one of a set of satellites 105 in accordance with the angle $\Phi$ of the selected satellite relative to the axis of the antenna array 100. This is accomplished by introducing a uniform difference $\delta\Theta$ between the phases $\Theta_1$, $\Theta_2$, $\Theta_3$, $\Theta_4$, etc., of the outputs of adjacent antennas of the array 100 according to the equation $$\delta\Theta = D \cos \Phi.$$

How this phase difference is introduced is described later in this specification.

While the embodiment of FIG. 1A-1C is shown with only four antennas in the phased array 100, it is understood that the number of antennas is typically much greater, particularly if the phased array 100 is a two or three dimensional array rather than the linear array illustrated in FIG. 1A-1C. Signal processing channels 102, 104, 106, 108, etc., process the RF signals received by respective ones of the individual antennas 101a, 101b, 101c, 101d, etc. Each of the signal processing channels is identical in structure, and a typical one of the signal processing channels (e.g., the signal processing channel 102 for the antenna 101a) will now be described for processing GPS signals.

The RF signal received by the antenna 101a is downconverted to an IF frequency by mixing it in a mixer 110 with the output of a local oscillator 115. The IF signals are then sampled by an analog-to-digital converter 120 to produced a digital signal. The received signal is a spread spectrum signal containing a pseudo-random code at a frequency f. In one implementation, the pseudo-random code frequency f was about 10 MHz and the local oscillator frequency was about 308 or 240 kHz below the 1.57542 or 1.22760 GHz, respectively, carrier frequency of the received signal, while the sampling frequency of the analog-to-digital converter was at the Nyquist frequency (i.e., 20 MHz in each of two (Real and Imaginary) quadrature channels) of the pseudo-random code main-lobe bandwidth (i.e., 20 MHz).

Alternatively, rather than downconverting the received RF signal, the received RF signal may be filtered through a 20 MHz bandpass filter (not shown)centered at the carrier frequency of 1.57542 GHz and then harmonically subsampled by the analog-to-digital converter 120. The sub-sampling frequency is the Nyquist frequency of the known frequency deviation in the received signal. This frequency deviation is, in the case of a typical GPS satellite signal, the 10 MHz frequency deviation created by the spread spectrum pseudo-random code contained in the signal. Therefore, the sub-harmonic sampling frequency of the analog-to-digital converter 120 is 2×10 MHz=20 MHz.

The parallel Real and Imaginary digital signals produced at the output of the analog-to-digital converter 120 are each converted to a quadrature signal, consisting of an in-phase component and a quadrature component, by combining the digital signal in a multiplier 135 with sine and cosine signals from a number controlled oscillator 130.

In addition to different Doppler frequencies, for GPS the signal of the selected satellite is distinguished from that of the other satellites 105 by correlating the received signal with the pseudo-random code of the selected satellite (which is known as a priori by the GPS receiver). For this purpose, a local pseudo-random code generator 150 produces the pseudo-random code of the selected satellite. (Of course, the same pseudo-random code is selected for the code generators 150 of all of the signal processing channels 102, 104, 106, 108 simultaneously, so that all channels acquire the same satellite.) The relative phase error between the GPS receiver and the selected satellite is determined by taking the arctangent of the ratio of the sine/cosine accumulator sums from 220, 230, and 240. Separate accumulators can be used to determine the phase error separately from each antenna element, or the relative phase error between antenna elements can be calculated according to formula (1).

In the illustrated embodiment, the early, prompt and late correlation functions produced from the signals of the different antennas of the array are multiplied by respective phase factors using respective phase angles $\Theta(1)$, $\Theta(2)$, $\Theta(3)$, $\Theta(4)$, etc., the difference between successive phase angles being determined from the satellite azimuthal angle $\Phi$ according to the formula stated above.

Specifically, the phase delay elements for each of the antennas of the phased array 100 that determine antenna beam direction are digitally synthesized within each of the signal processing channels 102, 104, 106, 108 by multiplying the digital quadrature signal by a respective phase factor $e^{i\Theta}$. The phase angle $\Theta$ is the phase delay corresponding to the particular antenna, and difference $\delta\Theta$ between phase angles $\Theta(j)$, $\Theta(j+1)$ of adjacent antennas being determined by the angle $\Phi$ of the selected satellite according to the formula stated above. In the illustrated embodiment of FIG. 1A-1C, this multiplication is carried out within each of the signal processing channels 102, 104, 106, 108 at the output of each of the three respective code correlators 181, 182, 183 by respective multipliers 191, 192, 193. Each multiplier is connected to receive the output of a phase angle register 195 that holds the appropriate value of $\Theta$ and to receive the output of a respective one of the code correlators 181, 182, 183. As a result, the three correlation functions produced by the respective code correlators 181, 182, 183 are shifted by the phase angle Θ by the multipliers 191, 192, 193, respectively. The phase angle stored in the register 195 is different for each of the signal processing channels 102, 104, 106, 108, the difference between phase angles Θ(j) and Θ(j+1) of adjacent channels being determined according to the formula given above. By replicating the digital components below the A/D 120, the antenna array beam can be simultaneously directed toward each satellite being tracked with the full array gain. Nulls can be simultaneously steered toward interfering sources (jammers or multipath) as desired.

It should be noted that while the embodiment of FIG. 1A-1C performs the phase angle multiplication on the correlation functions produced at the outputs of the code correlators 181, 182, 183, such multiplication by the requisite phase factor may be carried out at any other suitable stage of the process. For example, the multiplication could be carried out within each signal processing channel 102, 104, 106, 108 by shifting the phase generated by the NCO 130, which is supplied to multiplier 135 where the quadrature signal is produced.

With the introduction of the successive phase delay angles Θ(1), Θ(2), Θ(3), Θ(4), etc., in the respective signal processing channels 102, 104, 106, 108, the digital signals in each of the signal processing channels 102, 104, 106, 108 are in phase, and therefore may be combined. Specifically, the "early" correlation functions produced by each of the multipliers 191 of the signal processing channels 102, 104, 106, 108 are summed together in an adder 220. The "prompt" correlation functions produced by each of the multipliers 192 of the signal processing channels 102, 104, 106, 108 are summed together in an adder 230. The "late" correlation functions produced by each of the multipliers 193 of the signal processing channels 102, 104, 106, 108 are summed together in an adder 240. The adders 220, 230, 240 thus produce early, prompt and late correlation functions for the selected satellite combined in phase from each of the antennas in the phased array 100.

As described above, the sampling frequency of the analog-to-digital converters is the Nyquist frequency of the pseudo-random code contained in the received signal from the satellite, which in one implementation was about 20 MHz, dictating a sampling frequency of about 40 MHz consisting of quadrature channels, each at 20 MHz. In any case, the sampling frequency must be well within the capability of an ordinary microprocessor, aided by digital logic, to carry out the digital operations described above with reference to FIG. 1A-1C. Thus, all of the digital operations of all of the signal processing channels 102, 104, 106, 108 may be implemented in a single microprocessor plus Application Specific Integrated Circuit (ASIC). A master clock 400 in the microprocessor integrated circuit would synchronize all of the digital operations to the sampling frequency of the analog-to-digital converters of each of the signal processing channels 102, 104, 106, 108. These operations include the number controlled oscillators 130, the multipliers 135, the pseudo-random code generators 150, the delay elements 162, 164, the code correlators 181, 182, 183, the multipliers 191, 192, 193, the phase storage registers 195 of all of the signal processing channels 102, 104, 106, 108 as well as the GPS receiver's satellite select circuit 250. In an exemplary implementation, the master clock frequency was about 20 MHz.

In order to gain maximum advantage from the averaging function of the three adders 220, 230, 240, their sums are accumulated over a relatively long period before their sums are unloaded to the GP processor 300. In the exemplary embodiment in which the master clock 400 had a frequency of 20 MHz, the sums of the three adders were accumulated over successive 20 millisecond periods, so that their outputs were sampled at 50 Hz. Thus, the GP processor 300 updates its calculations at a rate of 50 Hz, which is sufficient up to about 7 G's of acceleration.

A global positioning processor 300 processes the averaged early, prompt and late correlation functions in a manner similar to that of a conventional global positioning system receiver having only a single antenna. However, the signal to noise ratio and the multipath rejection are inherently superior with the phased array 100 of FIG. 1A-1C for the reasons described earlier in this specification. An alternate implementation of the phased array would use analog RF phase shifters. The beam angle resolution and accuracy are much greater than they would be were RF phase delay components employed to realize the phased array antenna. The drift and lack of calibration of such RF component would introduce errors into the antenna array phase center well in excess of the few-mm level required by demanding applications. In comparison, the embodiment of FIG. 1A-1C carries out the phase delays in the digital domain in which the resolution is determined by the number of bits of each sample. For example, in one implementation the samples were 24 bits, so that the theoretical resolution was 19 cm$\times 2^{-24}$, or about 1/100 of a micron.

In accordance with a further aspect of the invention, the amplitudes of the correlation functions are exploited by the global positioning processor 300 to produce a feedback correction signal to the phase angle offset δΘ used by the satellite selection circuit 250 to determine the phase delays Θ for each of the signal processing channels. The amplitude of the correlation functions (or at least of the prompt correlation function) is a measure of the accuracy with which the beam direction of the phased array 100 is aligned with the angle of the satellite position. Therefore, the phase angle offset δΘ is corrected so as to maximize the amplitude of the correlation function or of a combination of the correlation functions. In cases where the SNR allows the signals from individual array elements to be directly tracked, each element is used to produce the required steering angle offset directly from the measured data. The antenna array attitude is determined as a useful byproduct for either approach.

Figure 2:
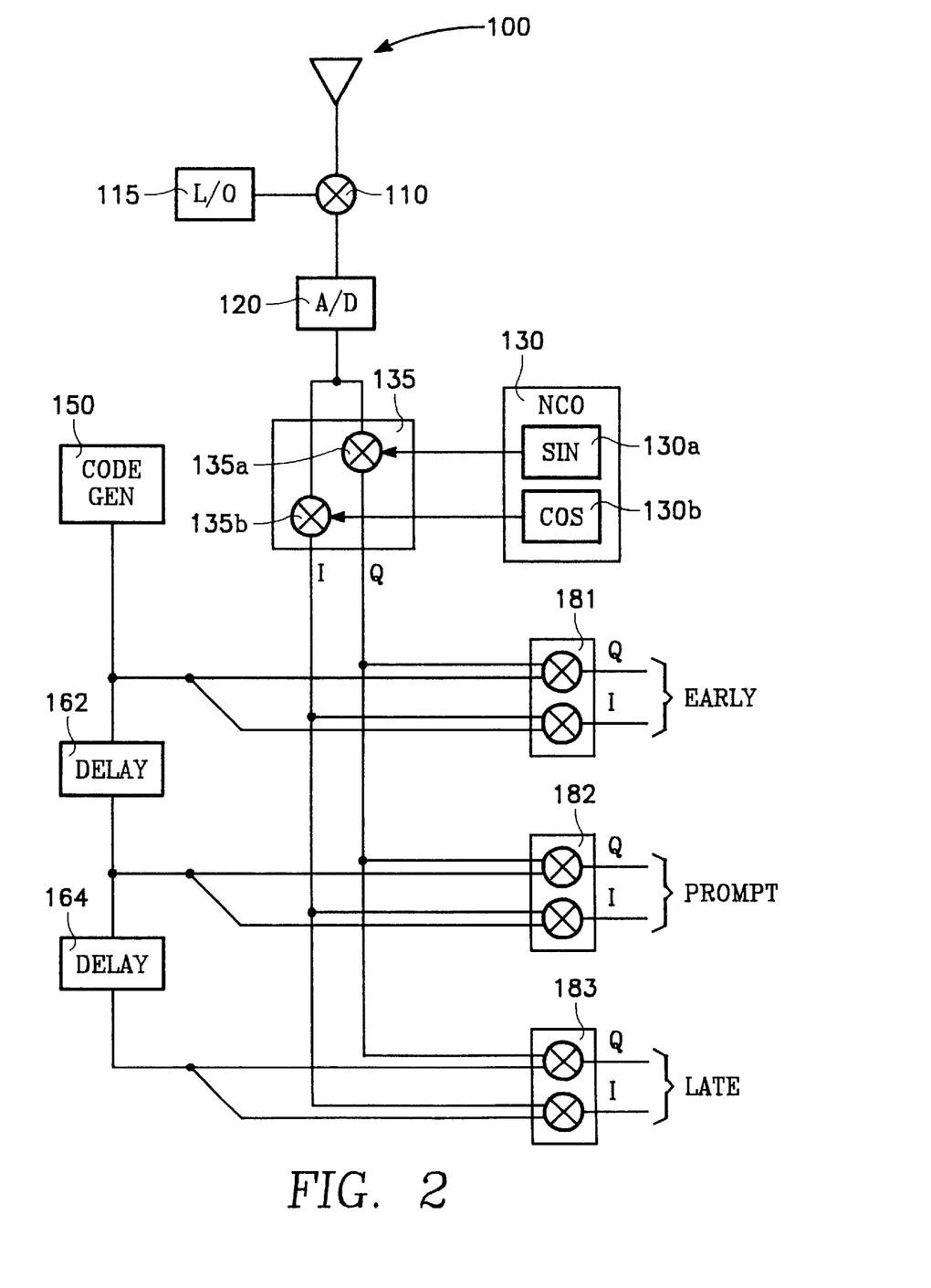
FIG. 2 is a schematic diagram of a portion of the phased array GPS receiver of FIG. 1A-1C showing the conversion of a digital signal to in-phase and quadrature components using a number controlled oscillator.

FIG. 2 illustrates how the number controlled oscillator 130 operates to convert the digital signal produced by the analog-to-digital converter 120 to a quadrature digital signal consisting of two components, an in-phase component (I) and a quadrature component (Q). Specifically, the number controlled oscillator 130 produces a digital representation of a sine wave and a cosine wave, the current digital representations of which are stored in a sine register 130a and a cosine register 130b. The multiplier 135 of FIG. 1A-1C actually consists of a pair of multipliers 135a, 135b shown in FIG. 2 which generate the Q and I components by multiplying the current digital sample by the current sine and cosine bit values, respectively. Similarly, each of the code correlators 181, 182, 183 actually consists of a pair of code correlators that multiply the current pseudo-random code bits by a respective one of the I and Q components, so that the autocorrelation functions thus produced each consists of an I component and a Q component. Thus, all of the digital signal processing after the multiplier 135 in each signal processing channel 102, 104, 106, 108 is performed in quadrature, requiring separate multiply and/or addition operations for each of the two (I and Q) components.

Figure 3:
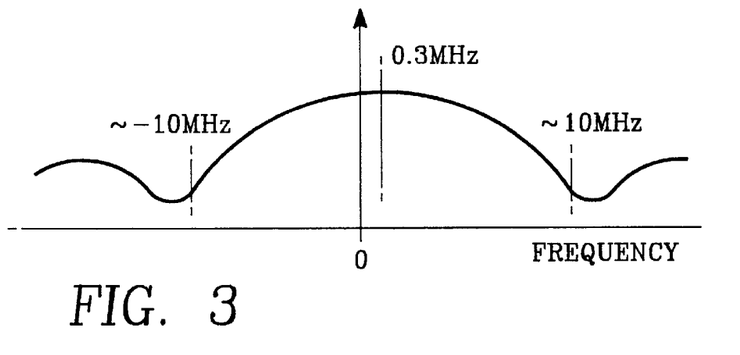
FIG. 3 is a graph illustrating the Fourier transform of the downconverted signal in the GPS receiver of FIG. 1A-1C.

FIG. 3 illustrates a portion of the amplitude of the Fourier transform of the received RF signal. The Fourier transform peaks in amplitude at the 300 kHz IF frequency established by the local oscillator 115. The main lobe of the Fourier transform extends to ±10 MHz, corresponding to the ±10 MHz frequency spreading produced by the pseudo-random code contained in the received RF signal.

Figure 4:
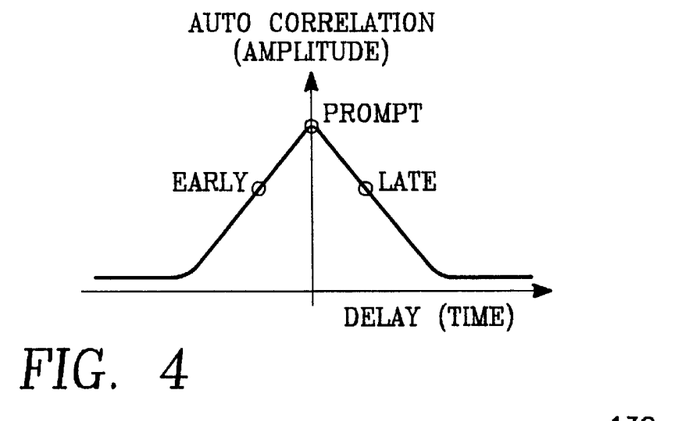
FIG. 4 illustrates the crosscorrelation function of the spread spectrum pseudo-random code as a function of delay between the received satellite code and the code generated by the GPS receiver.

FIG. 4 illustrates the behavior of the amplitude of an autocorrelation function as the delay between the GPS receiver and the satellite received signal varies. The correlation function peaks when the delay is zero and falls off otherwise. When the delay is zero, then the prompt autocorrelation function is at the peak value while the early and late autocorrelation functions are at lower but equal amplitudes. Thus, as referred to previously in this specification, pseudo-ranging may be accomplished using only the early and late autocorrelation functions by computing the difference between them. The sign of this difference indicates a late or early condition while a zero difference indicates a prompt condition.

Figure 5:
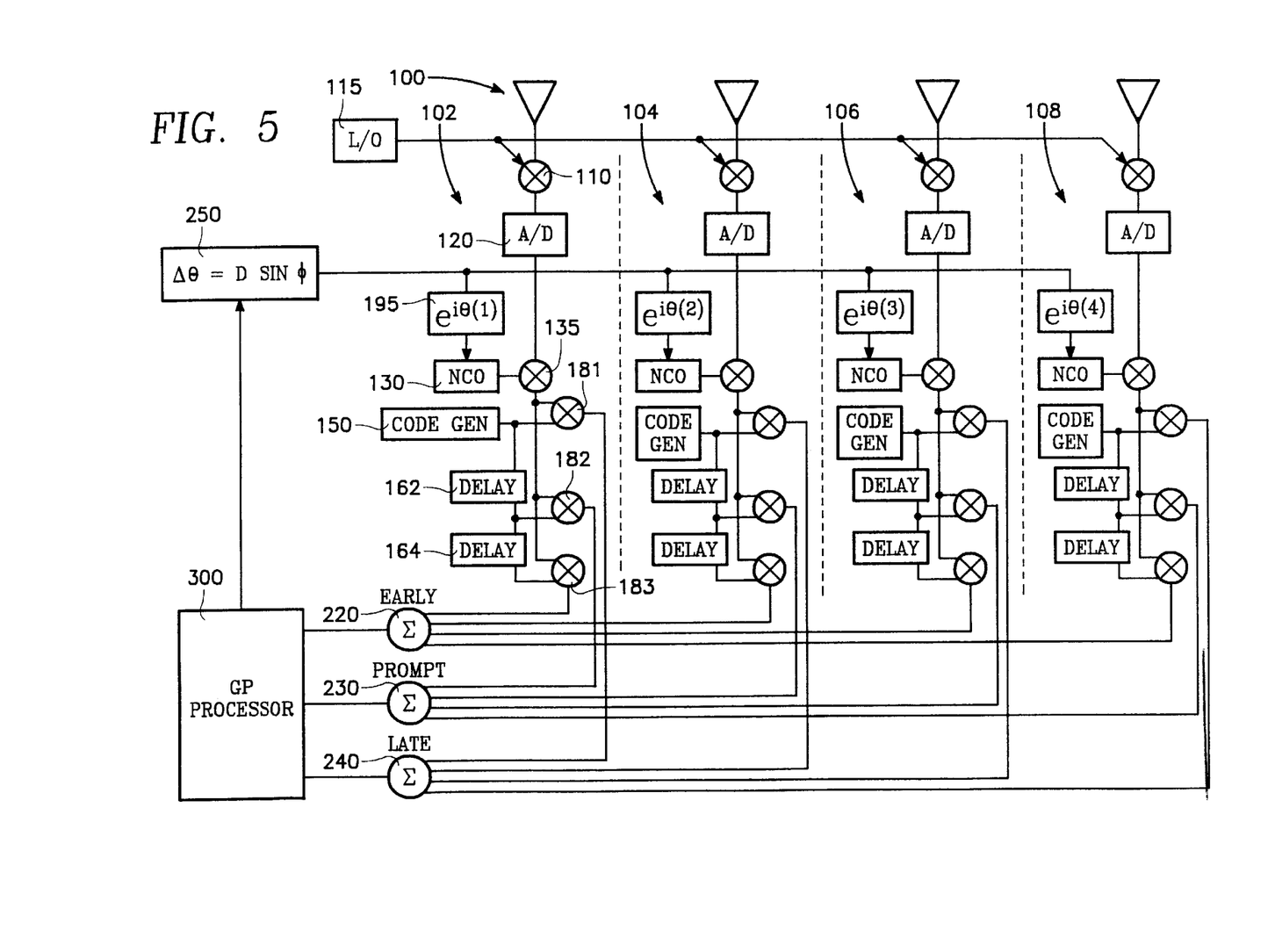
FIG. 5 is a schematic diagram of a second embodiment of a phased array GPS receiver, in which the phase delay elements are synthesized as index shifts in the number controller oscillators.
Figure 6:
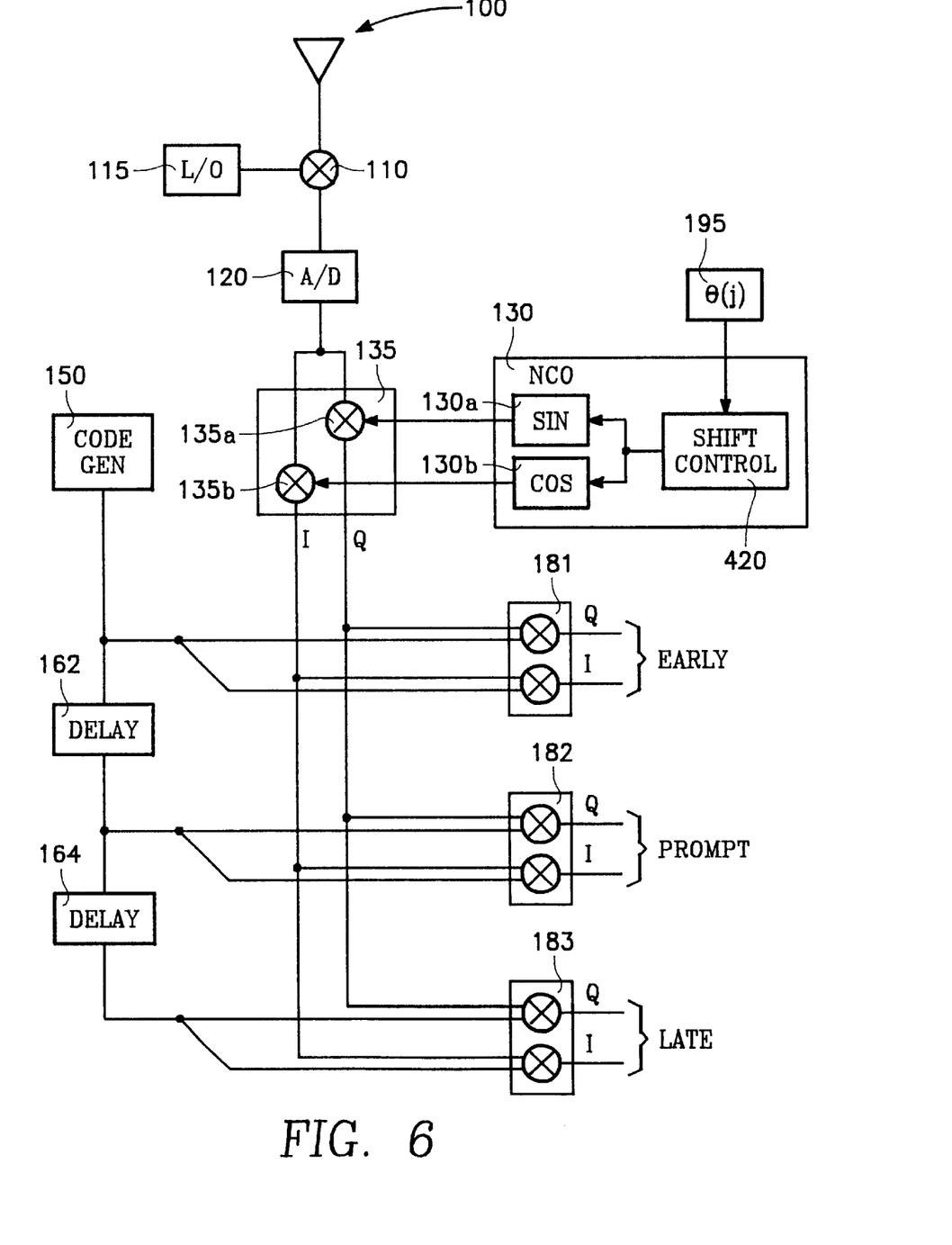
FIG. 6 is a schematic diagram of a portion of the phased array GPS receiver of FIG. 5 showing the conversion of a digital signal to in-phase and quadrature components using the number controlled oscillator whose indices are shifted in accordance with the respective phase delays.

FIG. 5 illustrates an embodiment in which the different phase delays for each signal channel 102, 104, 106, 108 are implemented by delaying each number controlled oscillator 130 by an amount corresponding to the appropriate phase angle $\Theta(j)$ for the particular signal processing channel 102, 104, 106 or 108 established by the satellite selection circuit 250. FIG. 6 is a schematic diagram similar to FIG. 2 but illustrating the feature of FIG. 5 in which each number controlled oscillator 130 is controlled by the phase angle $\Theta(j)$ assigned to the corresponding signal processing channel 102, 104, 106 or 108. FIG. 6 shows that the number controlled oscillator 130 has a shift control 420 controlling the timing with which the sine bits and cosine bits are shifted out of the sine and cosine registers 130a, 130b to the multipliers 135a, 135b. The shift control 420 is controlled, in turn, by the phase angle $\Theta$ received from the phase angle register 195, and by the general purpose processor 300 which calculates the residual carrier frequency in the sampled data.

Figure 7:
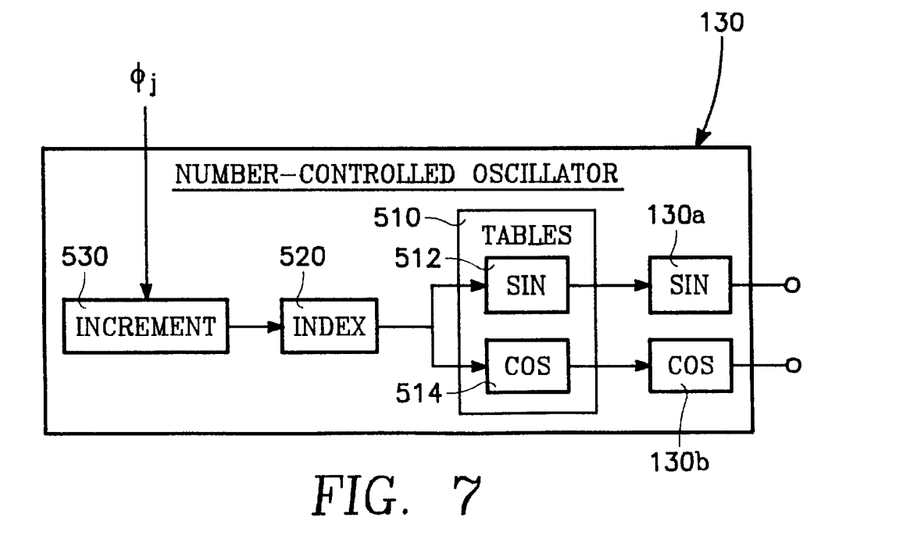
FIG. 7 is a diagram of the number controlled oscillator of FIG. 6.

FIG. 7 illustrates one way of implementing the concept of FIG. 6. Specifically, the number controlled oscillator 130 of FIG. 7 includes the sine and cosine registers 130a, 130b referred to above and, in addition, a set of tables 510 including a sine table 512 and a cosine table 514. The tables contain a complete succession of digital words or bytes representing complete cycles of a sine wave and of a cosine wave, respectively. The current word or byte of each of the tables 512, 514 is loaded into a respective one of the sine and cosine registers 130a, 130b. The current word or byte is addressed by an index value from an index register 520. The index value in the index register 520 is incremented by a controller 530. The controller 530 can advance or retard the progress of the index register 520 in accordance with the phase angle $\Theta(j)$ (converted to a phase delay time) assigned to the corresponding signal processing channel.

While the described embodiments employ a satellite selection circuit 250 to establish the various phase angles $\Theta$ for each of the signal processing channels 102, 104, 106, 108 based upon the pre-established locations of the various satellites 105, in some applications the satellite positions may be unknown or known to only a very rough degree of accuracy. In such a case, the satellite selection circuit 250 can randomly slew the phase angle difference $\delta\Theta$ through a continuum of values (within a sensible range such as zero to 180 degrees) while monitoring the corrective feedback loop from the global positioning processor so as to maximize the correlation function between the pseudo-random code of the selected satellite and the received signal. Once this maximum has been attained, the phase angle difference $\delta\Theta$ corresponds to an antenna beam direction pointing directly at the selected satellite. Alternately, for strong signals an estimate of the angle may be formed by measuring the carrier phase on each antenna and inverting equation (1).

While the invention has been described with reference to embodiments in which digital correlation techniques such as digital spread spectrum signal processes are employed, the invention may be implemented with any type of signal. Thus, the invention may be a digitally synthesized phased array antenna that receives any type of signal (e.g., FM or AM signals) emitted by plural sources and is able to select one of the sources. While pseudo-random noise code correlation techniques were employed in the foregoing embodiments to provide additional selectivity among the plural sources (i.e., among the plural GPS satellites), such additional selectivity may not be needed if the digitally synthesized phased array antenna by itself provides sufficient selectivity. On the other hand, such additional selectivity, if needed, may be provided using other techniques, such as doppler shift techniques that are well-known in the art. Thus, the invention is not confined to use with plural GPS satellites, but may be applied to select a source from among a set of any type of suitable emitters.

The invention has been described with reference to embodiments in which the spacing between the plural antenna elements is uniform and in which the antenna elements are located along a straight line on a plane surface. As a result, the differences between the respective phase multiplication factors in the foregoing embodiments are uniform (i.e., the differences between successive phase multiplication factors are all the same) and this common difference is determined by the desired antenna direction, in the manner described earlier herein. However, the phase differences between successive phase multiplication factors may be varied rather than being uniform so as to accommodate a non-uniform spacing between successive antenna elements. As a result, the spacing between the plural antenna elements may be non-uniform and, moreover, the surface on which the plural antenna elements lie need not be a plane surface, but can be a curved surface (such as a flight vehicle fuselage, for example). Such variations may be readily accommodated by providing a proportionately different phase multiplication factor for each of the different antenna elements. Those skilled in the art can readily apply the foregoing teachings to accommodate various arrangements of the plural antenna elements. As a very simple example, if the spacing between one adjacent pair of antenna elements is twice the common spacing between all other adjacent pairs of antenna elements, then the difference between phase multiplication factors of the one pair would differ by a factor of two from the differences between phase multiplication factors of the remaining pairs of adjacent antenna elements.

The invention has been described with reference to embodiments in which the phased array antenna's direction is pointed at a particular source in order to acquire it (i.e., at a selected GPS satellite). However, the invention may be employed in the opposite way so as to avoid or reject a particular unwanted source, such as a jamming transmitter, a nearby powerful noise source, or a source of multipath reflections. Thus, the digitally synthesized phased array antenna may be employed as an anti-jamming receiver, in which the direction of the phased array is pointed away from a noise source.

While the invention has been described in detail by specific reference to preferred embodiments, it is understood that variations and modifications thereof may be made without departing from the true spirit and scope of the invention.

What is claimed is:

1. A global positioning system (GPS) receiver for use with plural satellites that transmit RF signals distinguished from one another by unique pseudo-random spread spectrum codes, comprising:

an array of plural antennas having a spacing D between adjacent antennas of the array, and providing respective received RF signals;

a set of parallel digital signal processing channels for processing said respective RF signals, each one of said parallel digital signal processing channels comprising:

an analog-to-digital converter for converting the respective received RF signal to a respective digital signal;

a local pseudo-random code generator for generating a pseudo-random code corresponding to a selected one of said satellites;

a first correlator for computing a first correlation function between the pseudo-random code from said local pseudo-random code generator and said digital signal;

means for imposing a phase delay corresponding to a phase angle $\Theta$ in the digital signal flow through said one digital signal processing channel, the phase angle $\Theta$ being different in each of said channels and the difference between phase angles of channels corresponding to adjacent ones of said plural antennas being such as to align an antenna beam direction of said array toward said selected satellite corresponding to said pseudo-random code; and a first summing node for summing the first correlation functions produced by all of said parallel digital processing channels.

2. The apparatus of claim 1 wherein said means for imposing a phase delay comprises:

means for digitally multiplying said correlation function by a phase factor $e^{i\Theta}$.

3. The apparatus of claim 1 wherein:

each one of said parallel digital signal processing channels further comprises:

a quadrature generator for producing a digital sine signal and a digital cosine signal, and multipliers for multiplying said digital signal by, respectively, said digital cosine signal and by said digital sine signal so as to convert said digital signal to in-phase and quadrature digital signal components; and said means for imposing a phase delay comprises means connected to said quadrature generator for shifting said digital sine and cosine signals by an amount corresponding to said phase angle $\Theta$.

4. The apparatus of claim 1 wherein said selected satellite is at an azimuthal angle $\Phi$ relative to a plane of said array of antennas, and wherein said difference between phase angles is $\delta\Theta = D \sin \Phi$.

5. The apparatus of claim 1 further comprising a feedback loop between said correlation function and said means for imposing a phase delay for correcting said phase angle so as to optimize said correlation function.

6. The apparatus of claim 1 further comprising:

a second correlator for computing a second correlation function between a delayed version of the pseudo-random code from said local pseudo-random code generator and said digital signal;

a second summing node for summing the second correlation functions produced by all of said parallel digital processing channels;

a global positioning processor for processing the sums of said first and second correlation functions so as to determine a phase difference between said received signal and said local pseudo-random code generator.

7. The apparatus of claim 1 further comprising a satellite acquisition circuit for providing said phase difference $\delta\Theta$ corresponding to said selected satellite based upon a known azimuthal angle of said selected satellite.

8. The apparatus of claim 1 further comprising a satellite acquisition circuit for slewing said phase difference $\delta\Theta$ as to maximize said correlation function with the pseudo-random code of the selected satellite.

9. The apparatus of claim 1 further comprising a local oscillator for down-converting said RF signal to an IF signal, wherein said IF signal is the signal sampled by said analog-to-digital converter.

10. The apparatus of claim 1 further comprising a filter connected between said antenna and said analog-to-digital converter and having a bandwidth corresponding to the frequency deviation occasioned by said pseudo-random code, said analog-to-digital converter having a sampling frequency corresponding to a sub-harmonic sampling frequency of the filtered RF signal.

11. The apparatus of claim 1 wherein said summing circuit sums over plural sample times of said analog-to-digital converter.

12. A method of processing received global positioning system signals from plural satellites that transmit RF signals distinguished from one another by unique pseudo-random spread spectrum codes, said method comprising:

providing an array of plural antennas having a spacing D between adjacent antennas of the array and that capture respective received RF signals;

providing a set of parallel digital signal processing channels for processing said respective RF signals, and within each one of said parallel digital signal processing channels performing the following steps:

converting the respective received RF signal to a respective digital signal at a predetermine sampling frequency;

locally generating a pseudo-random code corresponding to a selected one of said satellites;

computing a first correlation function between the pseudo-random code from said local pseudo-random code generator and said digital signal;

imposing a phase delay corresponding to a phase angle $\Theta$ in the digital signal flow through said one digital signal processing channel, the phase angle $\Theta$ being different in each of said channels and the difference between phase angles of channels corresponding to adjacent ones of said plural antennas being such as to align an antenna beam direction of said array toward said selected satellite corresponding to said pseudo-random code; and summing the first correlation functions produced by all of said parallel digital processing channels.

13. The method of claim 12 wherein the step of imposing a phase delay comprises:

digitally multiplying said correlation function by a phase factor $e^{j\Theta}$.

14. The method of claim 12 wherein:

the steps for digitally processing in each one of said parallel digital signal processing channels further comprise:

producing a digital sine signal and a digital cosine signal, and multiplying said digital signal by, respectively, said digital cosine signal and by said digital sine signal so as to convert said digital signal to in-phase and quadrature digital signal components; and wherein the step of imposing a phase delay comprises shifting said digital sine and cosine signals by an amount corresponding to said phase angle $\Theta$.

15. The method of claim 12 wherein said selected satellite is at an azimuthal angle $\Phi$ relative to a plane of said array of antennas, and wherein said difference between phase angles is $\delta\Theta = D \sin \Phi$.

16. The method of claim 12 further comprising providing a feedback loop between said correlation function and the step of imposing a phase delay and correcting said phase angle so as to optimize said correlation function.

17. The method of claim 12 further comprising:

computing a second correlation function between a delayed version of the pseudo-random code from said local pseudo-random code generator and said digital signal;

summing the second correlation functions produced by all of said parallel digital processing channels;

processing the sums of said first and second correlation functions so as to determine a phase difference between said received signal and said local pseudo-random code generator.

18. The method of claim 12 further comprising providing said phase difference $\delta\Theta$ corresponding to said selected satellite based upon a known azimuthal angle of said selected satellite.

19. The method of claim 12 further comprising slewing said phase difference $\delta\Theta$ so as to maximize said correlation function with the pseudo-random code of the selected satellite.

20. The method of claim 12 further comprising down-converting said RF signal to an IF signal, wherein said IF signal is the signal sampled by said analog-to-digital converter.

21. The method of claim 12 further comprising filtering the RF signal prior to the step of converting it to a digital signal, the filtering being performed with a bandwidth corresponding to the frequency deviation occasioned by said pseudo-random code, said sampling frequency corresponding to a sub-harmonic sampling frequency of the filtered RF signal.

22. The method of claim 12 wherein the step of summing is carried out over plural cycles of said sampling frequency.

* * * * *